(12) United States Patent
Radhakrishnan

(10) Patent No.: US 11,809,980 B1
(45) Date of Patent: Nov. 7, 2023

(54) AUTOMATIC CLASSIFICATION OF DATA SENSITIVITY THROUGH MACHINE LEARNING

(71) Applicant: INTUIT INC., Mountain View, CA (US)

(72) Inventor: Vignesh Radhakrishnan, Bengaluru (IN)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 18/309,470

(22) Filed: Apr. 28, 2023

(51) Int. Cl.
*G06N 3/045* (2023.01)
*G06N 3/08* (2023.01)
*G06F 21/62* (2013.01)
*G06F 16/28* (2019.01)
*G06N 3/00* (2023.01)

(52) U.S. Cl.
CPC ........... *G06N 3/045* (2023.01); *G06F 16/285* (2019.01); *G06F 21/6245* (2013.01); *G06N 3/00* (2013.01); *G06N 3/08* (2013.01)

(58) Field of Classification Search
CPC ..... G06F 16/285; G06F 21/6245; G06N 3/00; G06N 3/045; G06N 3/08
See application file for complete search history.

(56) References Cited

PUBLICATIONS

Kužina, Vjeko, et al. "CASSED: Context-based Approach for Structured Sensitive Data Detection." Expert Systems With Applications 223 (2023): 119924. (Year: 2023).*

Zhang, Dan, et al. "Sato: Contextual semantic type detection in tables." arXiv preprint arXiv:1911.06311v3 (Jun. 2020). (Year: 2020).*

Hulsebos, Madelon, et al. "Sherlock: A deep learning approach to semantic data type detection." Proceedings of the 25th ACM SIGKDD International Conference on Knowledge Discovery & Data Mining. 2019. (Year: 2019).*

* cited by examiner

*Primary Examiner* — Benjamin P Geib
(74) *Attorney, Agent, or Firm* — Patterson + Sheridan, LLP

(57) ABSTRACT

Aspects of the present disclosure provide techniques for automated data classification through machine learning. Embodiments include providing first inputs to a first machine learning model based on a column header of a column from a table and receiving a first output from the first machine learning model in response to the first inputs, wherein the first output indicates a first likelihood that the column relates to a given classification. Embodiments include providing second inputs to a second machine learning model based on a value from the column and receiving a second output from the second machine learning model in response to the second inputs, wherein the second output indicates a second likelihood that the value relates to the given classification. Embodiments include determining whether to associate the value with the given classification based on the first output and the second output.

20 Claims, 5 Drawing Sheets

AUTOMATIC CLASSIFICATION OF DATA SENSITIVITY THROUGH MACHINE LEARNING

INTRODUCTION

Aspects of the present disclosure relate to techniques for using machine learning to automatically classify data. In particular, techniques described herein involve using separate machine learning models trained to classify data sensitivity of values based on features extracted from the values and from column headers of table columns in which the values appear.

BACKGROUND

Every year millions of people, businesses, and organizations around the world utilize software applications to assist with countless aspects of life. In some cases, users may input substantial amounts of data into software applications, such as in connection with various processing or storage tasks. Many applications allow data to be imported or otherwise stored in the form of tables, such as organized into columns and rows. Classifying such data, such as with indications of whether certain data items are sensitive and/or correspond to particular categories of data, is important for a variety of purposes, such as for restricting access to particular types of data, cataloging data, determining which items of data to use for particular processing tasks, and/or the like. However, it can be difficult to automatically classify such data when classifications have not been manually assigned. For example, large sets of electronic data may include a variety of formats, syntax, structures, and styles of representing information, and may include little to no metadata. Abbreviations, shorthand, acronyms, irregular terminology, and/or the like may frequently be used when electronic data is stored in tabular form, and may contribute to the challenges associated with automatic classification of such electronic data. For example, due to such factors, it may not be evident using conventional automated classification techniques whether a particular item of data should be classified one way or the other.

As such, there is a need in the art for improved techniques of automated data classification, particular for electronic data stored in tables.

BRIEF SUMMARY

Certain embodiments provide a method for automated data classification through machine learning. The method generally includes: providing one or more first inputs to a first machine learning model based on a column header of a column from a table, wherein the first machine learning model has been trained through a supervised learning process based on first training data comprising a plurality of column headers associated with labels indicating known classifications of the plurality of column headers; receiving a first output from the first machine learning model in response to the one or more first inputs, wherein the first output indicates a first likelihood that the column relates to a given classification; providing one or more second inputs to a second machine learning model based on a value from the column, wherein the second machine learning model has been trained through a corresponding supervised learning process based on second training data comprising a plurality of values associated with corresponding labels indicating corresponding known classifications of the plurality of values; receiving a second output from the second machine learning model in response to the one or more second inputs, wherein the second output indicates a second likelihood that the value relates to the given classification; and determining whether to associate the value with the given classification based on the first output and the second output.

Other embodiments provide a method for training machine learning models. The method generally includes: providing first inputs to a first machine learning model based on a column header of a column from a table; receiving first outputs from the first machine learning model in response to the first inputs, wherein the first outputs indicates first likelihoods that the column relates to a given classification; comparing the first outputs to a label associated with the column that indicates a known classification associated with the column; iteratively adjusting one or more first parameters of the first machine learning model based on the comparing of the first outputs to the label; providing second inputs to a second machine learning model based on a value from the column; receiving second outputs from the second machine learning model in response to the second inputs, wherein the second outputs indicates second likelihoods that the value relates to the given classification; comparing the second outputs to a corresponding label associated with the value indicating a corresponding known classification of the value; iteratively adjusting one or more second parameters of the second machine learning model based on the comparing of the second outputs to the corresponding label; and learning a first weight to assign to outputs from the first machine learning model and a second weight to assign to corresponding outputs from the second machine learning model based on the first outputs, the second outputs, and the corresponding label associated with the value.

Other embodiments provide a system comprising one or more processors and a non-transitory computer-readable medium comprising instructions that, when executed by the one or more processors, cause the system to perform a method. The method generally includes: providing one or more first inputs to a first machine learning model based on a column header of a column from a table, wherein the first machine learning model has been trained through a supervised learning process based on first training data comprising a plurality of column headers associated with labels indicating known classifications of the plurality of column headers; receiving a first output from the first machine learning model in response to the one or more first inputs, wherein the first output indicates a first likelihood that the column relates to a given classification; providing one or more second inputs to a second machine learning model based on a value from the column, wherein the second machine learning model has been trained through a corresponding supervised learning process based on second training data comprising a plurality of values associated with corresponding labels indicating corresponding known classifications of the plurality of values; receiving a second output from the second machine learning model in response to the one or more second inputs, wherein the second output indicates a second likelihood that the value relates to the given classification; and determining whether to associate the value with the given classification based on the first output and the second output.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
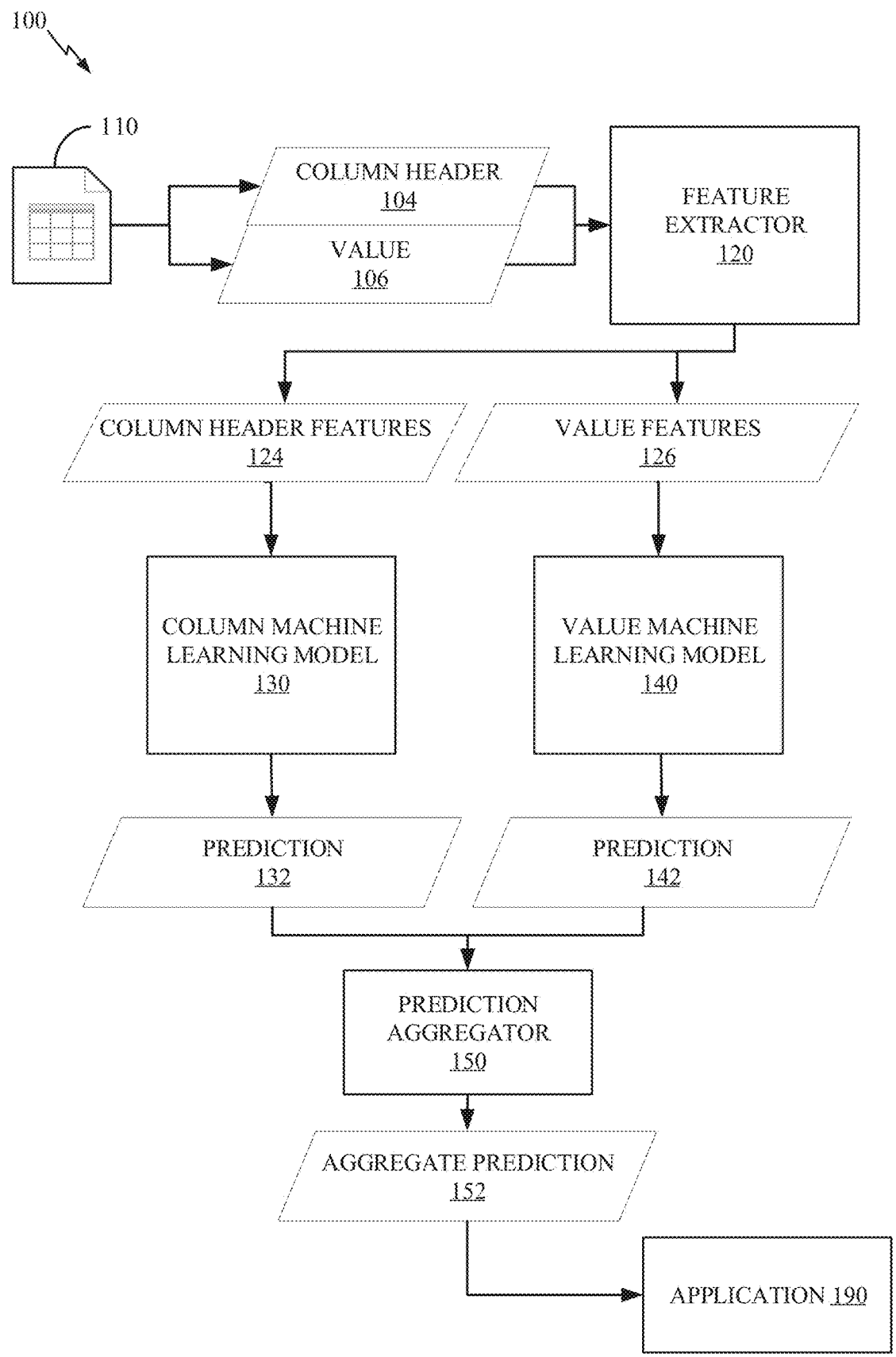
FIG. 1 depicts an example of utilizing machine learning models to determine a predicted classification of a value from a column of a table as described herein.

Aspects of the present disclosure provide apparatuses, methods, processing systems, and computer readable mediums for training and utilizing machine learning models to determine a predicted classification of a value from a column of a table.

According to certain embodiments, machine learning techniques are utilized in order to predict classifications of electronic data stored in tabular form (e.g., stored in a spreadsheet), such as to enable automated import and/or processing of such electronic data without the need for manual classification or the inclusion of metadata with such electronic data.

One example of electronic data stored in tabular form is a spreadsheet. Spreadsheets generally contain granular strings of text within separate "cells" organized in rows and columns. The first row in a column generally comprises a "column header" that identifies the contents of the column. For example, in a spreadsheet that stores data about customers of a business, one column may contain customer names and may begin with a column header such as "customer names". Each row within the column after the column header may include a name of a customer.

Automatically classifying such electronic data, such as to determine a data sensitivity type (e.g., determining whether personally identifiable information (PII) or other types of sensitive data are present), is challenging without metadata. For example, a string of numbers included in a cell of a spreadsheet may be sensitive PII, such as a social security number, or may be non-sensitive data, such as a publicly-available stock keeping unit (SKU) number of an inventory item. Considering the column header of the column in which the value appears may help to disambiguate the classification of the value, but raises additional challenges. For example, a column header may include acronyms, abbreviations, irregular syntax, and/or the like. A column header of "cst ss" for instance could potentially mean "customer social security number" (which would be sensitive data) or something else entirely such as "customer support survey" (which may not be sensitive).

In order to overcome these technical challenges, embodiments of the present disclosure involve the use of separate machine learning models that are trained to analyze particular types of features extracted from both a value and a column header of the column in which the value appears and output predicted classifications. The predicted classifications output by the separate machine learning models are then aggregated using weights that are learned through an iterative process in order to determine a final predicted classification for the value.

In a particular implementation, as described in more detail below with respect to FIGS. 1-5 a first "column" machine learning model is trained to predict classifications of columns based on column headers and a second "value" machine learning model is trained to predict classifications of values. Once the models are trained, they are both used in concert to predict a classification a previously-unclassified value that appears in a particular column in a table. Features of the value are provided as inputs to the value machine learning model and features of the column header of the column are provided as inputs to the column machine learning model. The features extracted from the value and/or column may include, for example, n-grams, embeddings, numbers of characters, numbers of digits, numbers of whitespaces, numbers of special characters, and/or the like. The value model outputs a predicted classification for the value, such as in the form of a confidence score or likelihood that each potential classification applies to the value, and the column model outputs a predicted classification for the column, which may also be in the form of a confidence score or likelihood that each potential classification applies to the column. The predicted classifications output by the value model and the column model are then aggregated. For example, for each potential classification, the confidence score output by the value model for that potential classification may be aggregated with the confidence score output by the column model for that potential classification, such as in a weighted average or other weighted combination where different weights are applied to the outputs from the two models. The weights may be learned based on the training data used to train one or both of the models. For example, the weights may be iteratively adjusted until they produce optimal results based on known classifications for particular values when the particular values and corresponding column headers are used to provide inputs to the value model and the column model.

The aggregate prediction produced through such an aggregation process for a given value may be used to perform one or more actions, such as automatically classifying the given value, recommending a classification for the given value for review and approval by a user, restricting access to the given value (e.g., if the aggregate predicted classification indicates that the given value is a certain type of sensitive information), performing a calculation based on the value, displaying the value to a user, determining a persistence strategy for the value (e.g., determining where to store the value), determining a retention period for the value, and/or the like. For example, if the aggregate predicted classification indicates that the value comprises a type of data that may not be stored outside of a given country (e.g., according to one or more laws or regulations), then the aggregate predicted classification may be used to determine that the value must be stored within the given country. In another example, the value may be stored for an amount of time that is determined based on the aggregate predicted classification, such as based on whether the value comprises a type of information that should only be retained for a given amount of time.

Embodiments of the present disclosure provide multiple improvements over conventional techniques for automatic data classification. For example, by utilizing separate machine learning models to analyze particular features of a value from a table as well as particular features of a column header of a column in which the value appears, techniques described herein allow for such a value to be accurately classified in an automated manner even when metadata is unavailable and/or when acronyms, abbreviations, irregular terminology, and/or the like would otherwise make it difficult to automatically classify such values. Applying targeted machine learning models trained specifically for values and column headers, and then aggregating outputs from both models using weights that are learned through an iterative process based on labeled data, rather than simply analyzing the text of a value as in conventional techniques, overcomes technical challenges associated with automatically classifying electronic data stored in tabular form by learning particular patterns, disambiguating irregular syntax common to such electronic data, and producing accurate classifications that could not otherwise be automatically determined. The use of deep learning in particular provides improved learning of the types of abbreviations and patterns that are typically found in tabular data, thereby improving the ability of a software application to automatically classify such data. For example, the large number of hidden layers and parameters in a deep neural network may allow the patterns present in tabular data to be more effectively identified and used for automated classification of such data.

Additionally, by training both machine learning models through a supervised learning process based on labeled training data and iteratively learning weights for aggregation based on outputs from both models, techniques described herein provide a system that improves itself iteratively via a feedback loop. The models and aggregation weights may be continually improved over time, such as through re-training based on user feedback received with respect to aggregate predictions produced using the models and aggregation process described herein. The use of embeddings as features further allows a machine learning model to be trained not only to identify particular text that has previously been determined to correspond to particular classifications, but also to identify latent similarities indicated by similarities between embeddings. The features that are extracted from values and column headers may also be dynamically selected based on which features produce the best results by both models (e.g., which may be learned over time), thereby providing a further self-improving aspect of techniques described herein. Embodiments of the present disclosure provide improved machine learning techniques though a unique combination of machine learning models that are used together in a learned aggregation process to produce an aggregate prediction based on particular types of input features, and allow for improved automated classification of electronic data, particularly in tabular form. By providing the ability to automatically classify electronic data with respect to data sensitivity with a high degree of accuracy, techniques described herein improve computing security by allowing for targeted access restrictions to be automatically applied to electronic data based on such automated classifications.

Automated Classification of Tabular Data Using Machine Learning

FIG. 1 is an illustration 100 of utilizing targeted machine learning models to determine a classification of a value from a column of a table based on features of the value and features of a column header of the column, as described herein.

File 110 represents electronic data in tabular form, such as a spreadsheet, that includes a plurality of text strings contained within cells that are organized into columns and rows. A spreadsheet is included as an example, and techniques described herein may be used to classify text strings from other types of files. In one example, file 110 is a spreadsheet containing data related to a business, and is uploaded for use in a software application that provides financial management functionality. A user of application 190 may wish to import the contents of file 110 into application 190 without manually entering the data into application 190, file 110 may be automatically discovered by application 190, file 110 may already be stored in association with application 190, and/or the like. For example, application 190 may be a software application that provides financial services such as accounting and/or tax preparation functionality.

A feature extractor 120 extracts features from values and column headers from file 110, such as extracting column header features 124 from column header 104 and extracting value features 126 from value 106. The features extracted by feature extractor 120 (e.g., column header features 124 and value features 126) may include, for example, n-grams, embeddings, numbers of characters, numbers of digits, numbers of white spaces, and/or the like.

An n-gram generally refers to a contiguous sequence of n items from a given sample of text, and can be a phoneme, syllable, letter, word, base pair, phrase, or the like. In some cases, n-grams may overlap. For example, if n=3, and the items are characters, the text string "cust_name" may be processed to determine the following n-grams: cus, ust, st_, t_n, na, nam, and ame. This is included as an example, and other methods of determining n-grams may also be employed.

An "embedding" is generated by determining an x-dimensional vector representing text (e.g., a word, a string, a character, a phrase, an n-gram, and/or the like) as a vector in x-dimensional space. For example, an embedding model used to generate embeddings may be a neural network, and may learn a representation (embedding) for an item of data through a training process that trains the neural network based on a data set, such as a plurality of data items (e.g., words in bodies of text). An embedding may represent the meaning of a word or phrase or other text item based on the context in which the word or phrase or other text item appears in text (e.g., based on nearby words and/or phrases and/or text items). In one example, the embedding model comprises a Bidirectional Encoder Representations from Transformer (BERT), which involves the use of masked language modeling to determine word embeddings. In other embodiments, the embedding model may involve alternative existing embedding techniques, such as Word2Vec and GloVe embeddings. These types of embedding techniques are included as examples, and other types of embedding techniques may be used.

In some embodiments, the features that are extracted by feature extractor 120 are selected based on indications from column machine learning model 130 and/or value machine learning model 140 about which types of features have been most useful in producing accurate predictions (e.g., which may be determined during model training and/or as the model(s) are used to generate predictions over time).

Column header features 124, extracted from column header 104, are provided as inputs to column machine learning model 130, while value features 126, extracted from value 106, are provided as inputs to value machine learning model 140.

Column machine learning model 130 and value machine learning model 140 generally represent machine learning models that have been trained through supervised learning processes.

There are many different types of machine learning models that can be used in embodiments of the present disclosure. For example, column machine learning model 130 and/or value machine learning model 140 may be a neural network, a support vector machine, a Bayesian belief network, a regression model, a deep belief network, among others. One or both of the models may also be an ensemble of several different individual machine learning models. Such an ensemble may be homogenous (i.e., using multiple member models of the same type, such as a random forest of decision trees) or non-homogenous (i.e., using multiple member models of different types). Individual machine learning models within such an ensemble may all be trained using the same subset of training data or may be trained using overlapping or non-overlapping subsets randomly selected from the training data.

In on example, column machine learning model 130 and value machine learning model 140 are both deep neural networks. Neural networks generally include a collection of connected units or nodes called artificial neurons. The operation of neural networks can be modeled as an iterative process. Each node has a particular value associated with it. In each iteration, each node updates its value based upon the values of the other nodes, the update operation typically consisting of a matrix-vector multiplication. In some cases, a neural network comprises one or more aggregation layers, such as a softmax layer. A shallow neural network generally includes only a small number of "hidden" layers between an input layer and an output layer. By contrast, a deep neural network (DNN) generally includes a larger number of hidden layers. Deep learning techniques, such as those employed by deep neural networks, may be particularly well-suited to automated classification of tabular data using techniques described herein, such as due to the large number of hidden layers and parameters.

In some embodiments, training of a machine learning model is a supervised learning process that involves providing training inputs (e.g., representing column headers or values) as inputs to a machine learning model. The machine learning model processes the training inputs and outputs predictions (e.g., indicating likelihoods of particular classifications) based on the training inputs. The predictions are compared to the known labels associated with the training inputs (e.g., labels manually applied to training data by experts indicating known classifications of the column headers or values) to determine the accuracy of the machine learning model, and parameters of the machine learning model are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for a machine learning model, such as based on validation data and test data, as is known in the art. Such a training process may be performed for column machine learning model 130 based on a first training data set comprising features of column headers associated with labels indicating known classifications for the column headers, and for value machine learning model 140 based on a second training data set comprising features of values associated with labels indicating known classifications for the values.

Once trained, column machine learning model 130 and value machine learning model 140 may output predicted classifications in response to input features, such as representing likelihoods that the input features correspond to one or more potential classifications.

Column machine learning model 130 outputs prediction 132 in response to column header features 124. Prediction 132 generally represents a predicted classification for column header 104 based on column header features 124, such as including one or more numerical values indicating one or more likelihoods that column header 104 corresponds to one or more possible classifications.

Value machine learning model 140 outputs prediction 142 in response to value features 126. Prediction 142 generally represents a predicted classification for value 106 based value features 126, such as including one or more numerical values indicating one or more likelihoods that value 106 corresponds to one or more possible classifications.

The possible classifications may, for example, correspond to types of sensitive data, such as including credit card number, credit score, internet protocol (IP) address, date of birth, device identifier, employee identification number, email address, username, password, financial account number, government identifier, individual name, non-business address, non-business phone number, social security number (SSN), multi-sensitive data (e.g., data that includes more than one type of sensitive data, such as a combination of sensitive data types), and/or the like. These classifications are included as examples, and other types of classifications may also or alternatively be used.

Application 190 may use aggregate prediction 152 to perform one or more operations, such as importing text from document 110. For example, application 190 may populate a variable corresponding to a state (e.g., a state in which an employee works or resides) with value 106 based on aggregate prediction 152. Thus, the contents of file 110 may be automatically imported into application 190 despite file 110 not conforming to any particular format or containing any particular metadata, and despite containing few or no words. Furthermore, data automatically imported into application 190 using techniques described herein may be displayed via a user interface.

Predictions 132 and 142 are aggregated by prediction aggregator 150 to produce an aggregate prediction 152. Prediction aggregator 150 generally performs one or more calculations based on predictions 132 and 142, such as using different weights associated with column headers and values. In one example, prediction aggregator 150 performs a weighted average of predictions 132 and 142 based on weights specific to column headers and values. Weights used by prediction aggregator 150 may be learned through an iterative process based on labeled training data. For example, features of a column header may be provided to column machine learning model 130 and features of a value from a column corresponding to the column header may be provided to value machine learning model 140, and the models may produce respective predictions. Weights for each of the respective predictions may be iteratively adjusted until the result of the aggregation (e.g., weighted average) of the respective predictions matches a label indicating a known classification for the value. This process may be repeated for a plurality of column header and value pairs to learn the weights.

In one example predictions 132 and 142 each comprise one or more likelihoods of one or more possible categories. Prediction aggregator 150 may perform weighted aggregation for each possible category based on the likelihoods for that category indicated in each of prediction 132 and prediction 142. For example, if prediction 132 indicates that column header 104 is 80% likely (e.g., indicated by a value of 0.8) to correspond to the classification of credit card number and prediction 142 indicates that value 106 is 60% likely (e.g., indicated by a value of 0.6) to correspond to the classification of credit card number, prediction aggregator 150 may perform a weighted average of 0.8 and 0.6. If the weight associated with column headers is 0.6 and the weight associated with values is 0.4 (e.g., which may have been iteratively learned), then prediction aggregator 150 may generate aggregate prediction 152 by multiplying 0.8 by the weight of 0.6 and multiplying 0.6 by the weight of 0.4, and adding the products of these multiplication operations. In this example, aggregate prediction 152 would indicate that value 106 is 72% likely to correspond to the classification of credit card number (e.g., indicated by a value of 0.72).

Aggregate prediction 152 is then provided to application 190. For example, application 190 may use aggregate prediction 152 to perform one or more actions, such as recommending a classification for value 106 to a user via a user interface, automatically classifying value 106 (e.g., if aggregate prediction 152 exceeds a threshold for a particular classification), enacting one or more access controls for value 106, such as restricting access to value 106 based on aggregate prediction 152, populating one or more variables based on aggregate prediction 152, automatically extracting and/or cataloging data from file 110 based on aggregate prediction 152, and/or the like.

In some cases a user may provide feedback with respect to aggregate prediction 152, such as based on reviewing a recommended or automatically assigned classification of value 106. For example, the user may provide input indicating whether the classification is correct and/or providing a corrected classification for value 106. The user feedback may be used to generate updated training data for re-training column machine learning model 130, value machine learning model 130, and/or for learning updated weights for use by prediction aggregator 150. For instance, one or more new training data instances comprising features of value 106 and/or column header 104 and label(s) based on the user feedback may be generated and used in a model training and/or weight learning process. The re-trained model(s) and/or weights may then be used to determine subsequent aggregate predictions with improved accuracy. Training of machine learning models 130 and 140 is described in more detail below with respect to FIG. 3.

Figure 2:
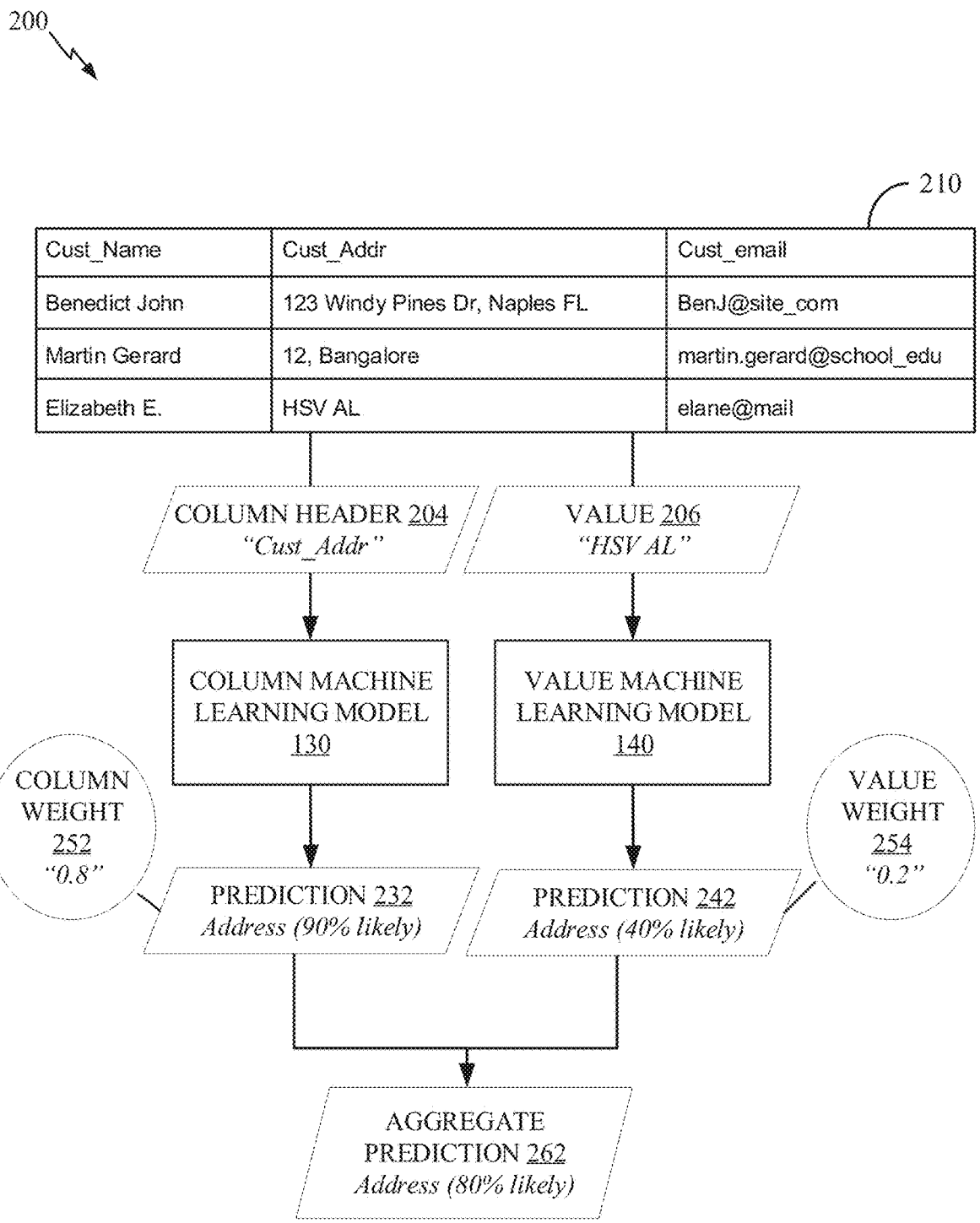
FIG. 2 depicts another example of utilizing machine learning models to determine a predicted classification of a value from a column of a table as described herein.

FIG. 2 is an illustration 200 of automated classification of tabular data using machine learning techniques as described herein. Illustration 200 comprises column machine learning model 130 and value machine learning model 140 of FIG. 1.

A table 210 comprises a plurality of columns, each column having a column header and a plurality of values. The first column has a column header of "Cust_Name" and includes the values "Benedict John," "Martin Gerard," and "Elizabeth E." The second column has a column header of "Cust_Addr" and includes the values "123 Windy Pines Dr, Naples FL," "12, Bangalore," and "HSV AL." The third column has a column header of "Cust_email," and includes the values "BenJ@site_com," "martin.gerard@school_edu," and "elane@mail."

Some of the values in table 210 may be easier to automatically classify based on the text of the value itself, such as "123 Windy Pines Dr, Naples FL," which conforms to an expected pattern of an address. However, other values in table 210 may be more difficult to automatically classify based on the text of the value itself, such as "HSV AL" not conforming to an expected pattern of an address. Furthermore, the column headers include particular abbreviations such as "Cust_Addr" that might not match other similar column headers of columns with known classifications.

Accordingly, the column header 204 ("Cust_Addr") and the value 206 ("HSV AL") are used to provide inputs to column machine learning model 130 and value machine learning 140, respectively. For example, features may be extracted from column header 204 and provided as inputs to column machine learning model 130, and features may be extracted from value 206 and provided as inputs to value machine learning model 140.

Column machine learning model 130 outputs a prediction 232 indicating that column header 204 is 90% likely to correspond to the classification of address. Value machine learning model 140 outputs a prediction 242 indicating that value 206 is 40% likely to correspond to the classification of address.

A column weight 252 ("0.8") is applied to prediction 232 and a value weight 254 ("0.2") is applied to prediction 242 during an aggregation process in order to produce aggregate prediction 262. For example (0.9×0.8)+(0.4×0.2)=0.8. Thus, aggregate prediction 262 indicates that value 206 is 80% likely to correspond to the classification of address.

Column weight 252 and value weight 254 may be learned iteratively based on training data, and may be updated over time as new training data becomes available (e.g., based on user input), such as to give more weight to the predictions produced by the model with the highest accuracy of the two models and to give less weight to the predictions produced by the model with the lowest accuracy of the two models.

Training Machine Learning Model(s) for
Automated Classification of Tabular Data

Figure 3:
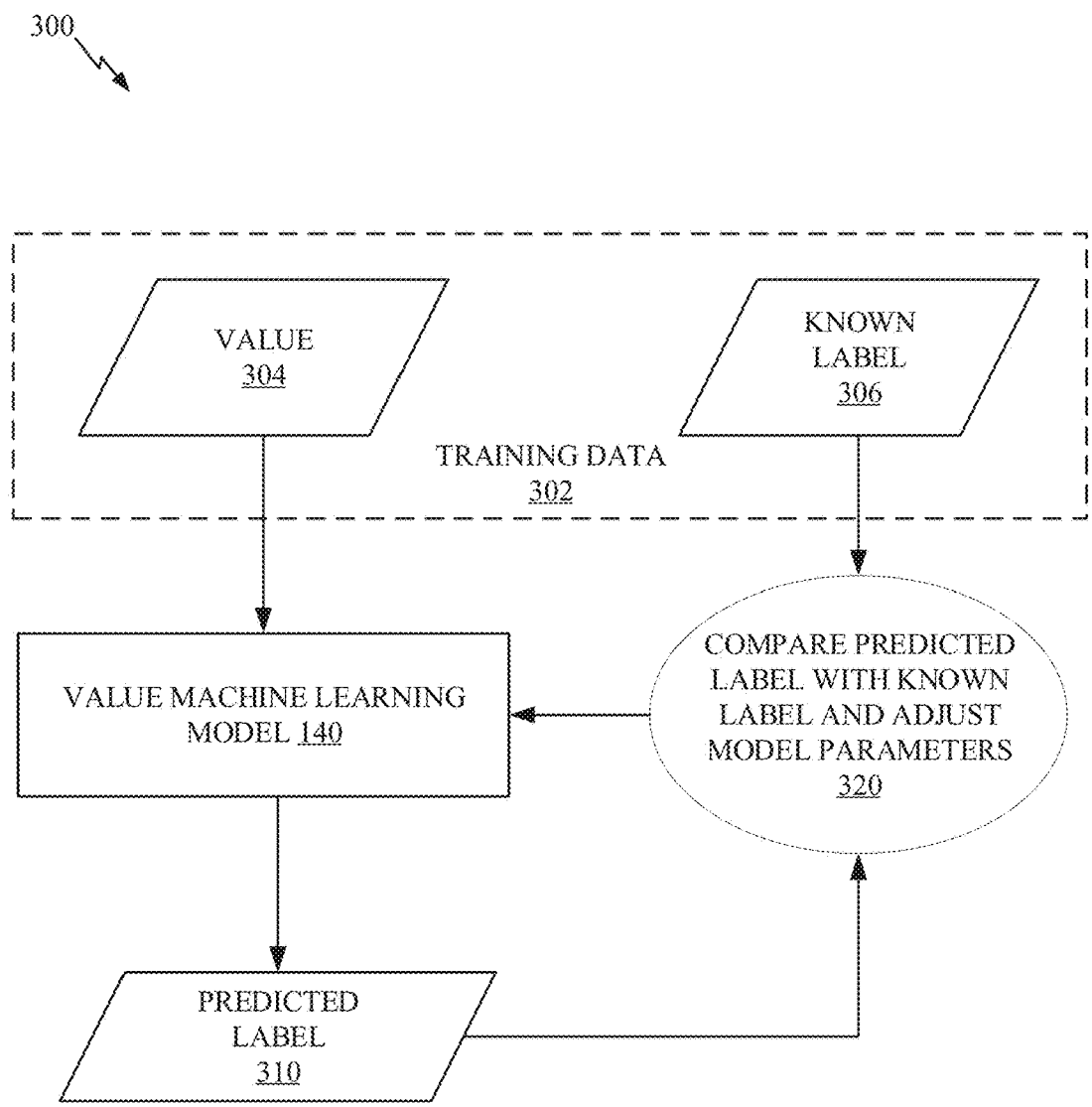
FIG. 3 depicts an example of training machine learning models to determine predicted classifications of values from columns of tables as described herein.

FIG. 3 is an illustration 300 of an example of training a machine learning model for automated classification of tabular data as described herein. Illustration 300 includes value machine learning model 140 of FIGS. 1 and 2, but could also apply to training column machine learning model 130 of FIGS. 1 and 2. For example, training operations may be performed by a model training component.

Training data 302 may include a plurality of values (represented by example value 304) associated with known labels (represented by example known label 306). For example, training data 302 may include a plurality of values that have previously been classified by a user or expert, and the labels may indicate these known classifications. Alternatively or additionally, training data 302 may include column headers association with known labels.

There are many different types of machine learning models that can be used in embodiments of the present disclosure. For example, value machine learning model 140 may be a deep neural network (DNN). Value machine learning model 140 may also be an ensemble of several different individual machine learning models. Such an ensemble may be homogenous (i.e., using multiple member models of the same type) or non-homogenous (i.e., using multiple member models of different types). Individual machine learning models within such an ensemble may all be trained using the same subset of training data or may be trained using overlapping or non-overlapping subsets randomly selected from the training data.

In some embodiments, training value machine learning model 140 is a supervised learning process that involves providing training inputs representing values (e.g., features of values, such as n-grams, embeddings, numbers of characters, numbers of digits, numbers of white spaces, and/or the like) as inputs to value machine learning model 140. Value machine learning model 140 processes the training inputs through its various layers and outputs predictions (e.g., predicted label 310) indicating predicted classifications with respect to the values represented by the inputs. Predictions may, in some embodiments, be in the form of probabilities with respect to each possible classification, such as indicating a likelihood that a value corresponds to each of a set of possible classifications. The predictions (e.g., predicted label 310) are compared to the known labels associated with the training inputs (e.g., known label 306) to determine the accuracy of value machine learning model 140, and value machine learning model 140 is iteratively adjusted until one or more conditions are met. For instance, the one or more conditions may relate to an objective function (e.g., a cost function or loss function) for optimizing one or more variables (e.g., classification accuracy). In some embodiments, the conditions may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for value machine learning model 140, such as based on validation data and test data, as is known in the art.

For example, at step 320, parameters of the various layers of value machine learning model 140 are iteratively adjusted until predicted label 310 matches known label 306 or until some other condition is met, such as optimization of an objective function or the occurrence of a successive number of iterations with minimal or no improvement.

In some embodiments, back-propagation is used to train the model. Back-propagation generally refers to a process of calculating a gradient based on a loss function, comparing recreated input with the actual input. By propagating this gradient "back" through the layers of the model, the weights and/or other parameters can be modified to produce more accurate outputs on subsequent attempts to recreate the input.

A loss function is a type of objective function used to minimize "loss" (e.g., the value calculated by the loss function) during training iterations for a machine learning model. Components included in a loss function may relate to the determined accuracy of the machine learning model during a given training iteration with respect to one or more particular conditions.

Minimizing a loss function during model training generally involves searching for a candidate solution (e.g., a set of model parameters including weights and biases, and the like) that produces the lowest value as calculated by the custom loss function. According to certain embodiments of the present disclosure, an objective function such as a loss function is designed to minimize classification inaccuracy (e.g., prioritizing accuracy of predicted labels such as predicted label 310).

Once trained, value machine learning model 140 may be used as described herein to determine classifications of values from tables. Column machine learning model 130 of FIGS. 1 and 2 may also be trained in a similar manner, and may be used together with value machine learning model 140 as described herein. Furthermore, value machine learning model 140 and column machine learning model 130 may indicate which feature types were most useful in determining accurate predictions during the training process, and these feature types may be used by a feature extractor (e.g., feature extractor 120 of FIG. 1) to extract features from values and/or column headers.

Example Operations for Automated Data Classification through Machine Learning

Figure 4:
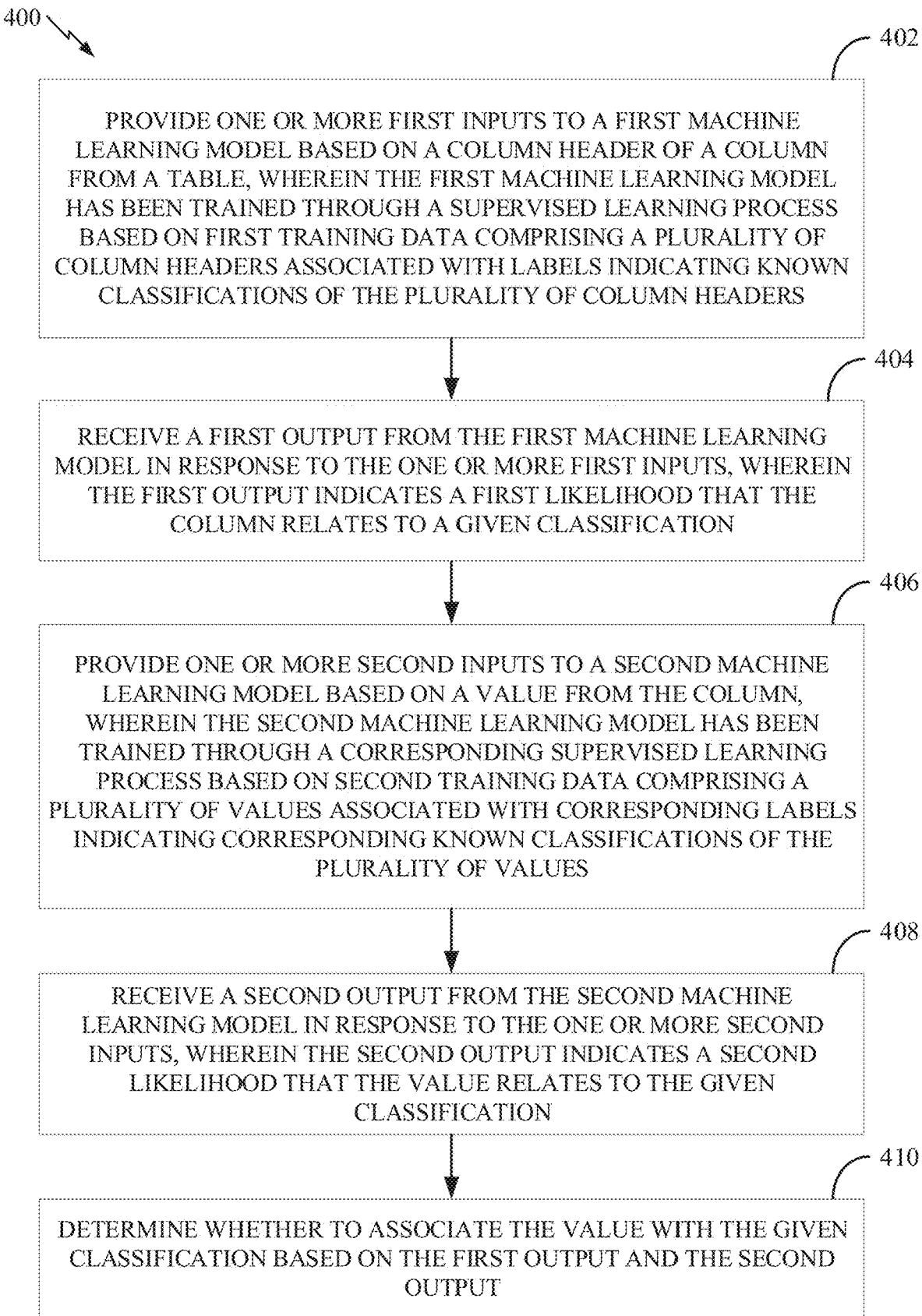
FIG. 4 depicts example operations related to automated data classification through machine learning.

FIG. 4 depicts example operations 400 for automated data classification through machine learning. For example, operations 400 may be performed by data classification engine 513 of FIG. 5 and/or additional components depicted in FIGS. 1-3.

Operations 400 begin at step 402 with providing one or more first inputs to a first machine learning model based on a column header of a column from a table, wherein the first machine learning model has been trained through a supervised learning process based on first training data comprising a plurality of column headers associated with labels indicating known classifications of the plurality of column headers.

In some embodiments, the one or more first inputs are based on extracting, from the column header, one or more features comprising: a plurality of character n-grams; one or more word embeddings; a total number of characters in the column header; a total number of digits in the column header; or an indication of whether a particular character is present in the column header. In certain embodiments, the one or more first inputs are based on a set of feature types that were selected based on the supervised learning process.

Operations 400 continue at step 404, with receiving a first output from the first machine learning model in response to the one or more first inputs, wherein the first output indicates a first likelihood that the column relates to a given classification. In certain embodiments, the given classification indicates a sensitivity type of the value.

Operations 400 continue at step 406, with providing one or more second inputs to a second machine learning model based on a value from the column, wherein the second machine learning model has been trained through a corresponding supervised learning process based on second training data comprising a plurality of values associated with corresponding labels indicating corresponding known classifications of the plurality of values.

In some embodiments, the one or more second inputs are based on extracting, from the value, one or more features comprising: a plurality of n-grams; one or more embeddings; a total number of characters in the value; a total number of digits in the value; or an indication of whether a particular character is present in the value.

Operations 400 continue at step 408, with receiving a second output from the second machine learning model in response to the one or more second inputs, wherein the second output indicates a second likelihood that the value relates to the given classification.

Operations 400 continue at step 410, with determining whether to associate the value with the given classification based on the first output and the second output.

In certain embodiments, the determining of whether to associate the value with the given classification based on the first output and the second output comprises applying a first weight associated with column headers to the first output and a second weight associated with values to the second output. The first weight associated with column headers and the second weight associated with values may have been learned based on the first training data and the second training data.

Some embodiments further comprise recommending the given classification for the value via a user interface. Certain embodiments further comprise receiving user input via the user interface in response to the recommending; and generating updated training data for the first machine learning model or the second machine learning model based on the user input. The first machine learning model and/or the second machine learning model may be re-trained based on the updated training data.

Some embodiments further comprise restricting access to the value based on the determining whether to associate the value with the given classification.

Certain embodiments comprise training the value machine learning model and the column machine learning model. For example, embodiments may include providing first inputs to a first machine learning model based on a column header of a column from a table, receiving first outputs from the first machine learning model in response to the first inputs, wherein the first outputs indicates first likelihoods that the column relates to a given classification, comparing the first outputs to a label associated with the column that indicates a known classification associated with the column, and iteratively adjusting one or more first parameters of the first machine learning model based on the comparing of the first outputs to the label. Embodiments may further include providing second inputs to a second machine learning model based on a value from the column, receiving second outputs from the second machine learning model in response to the second inputs, wherein the second outputs indicates second likelihoods that the value relates to the given classification, comparing the second outputs to a corresponding label associated with the value indicating a corresponding known classification of the value, and iteratively adjusting one or more second parameters of the second machine learning model based on the comparing of the second outputs to the corresponding label.

Embodiments may further include learning a first weight to assign to outputs from the first machine learning model and a second weight to assign to corresponding outputs from the second machine learning model based on the first outputs, the second outputs, and the corresponding label associated with the value.

Notably, operations 400 is just one example with a selection of example steps, but additional methods with more, fewer, and/or different steps are possible based on the disclosure herein.

Example Computing System

Figure 5:
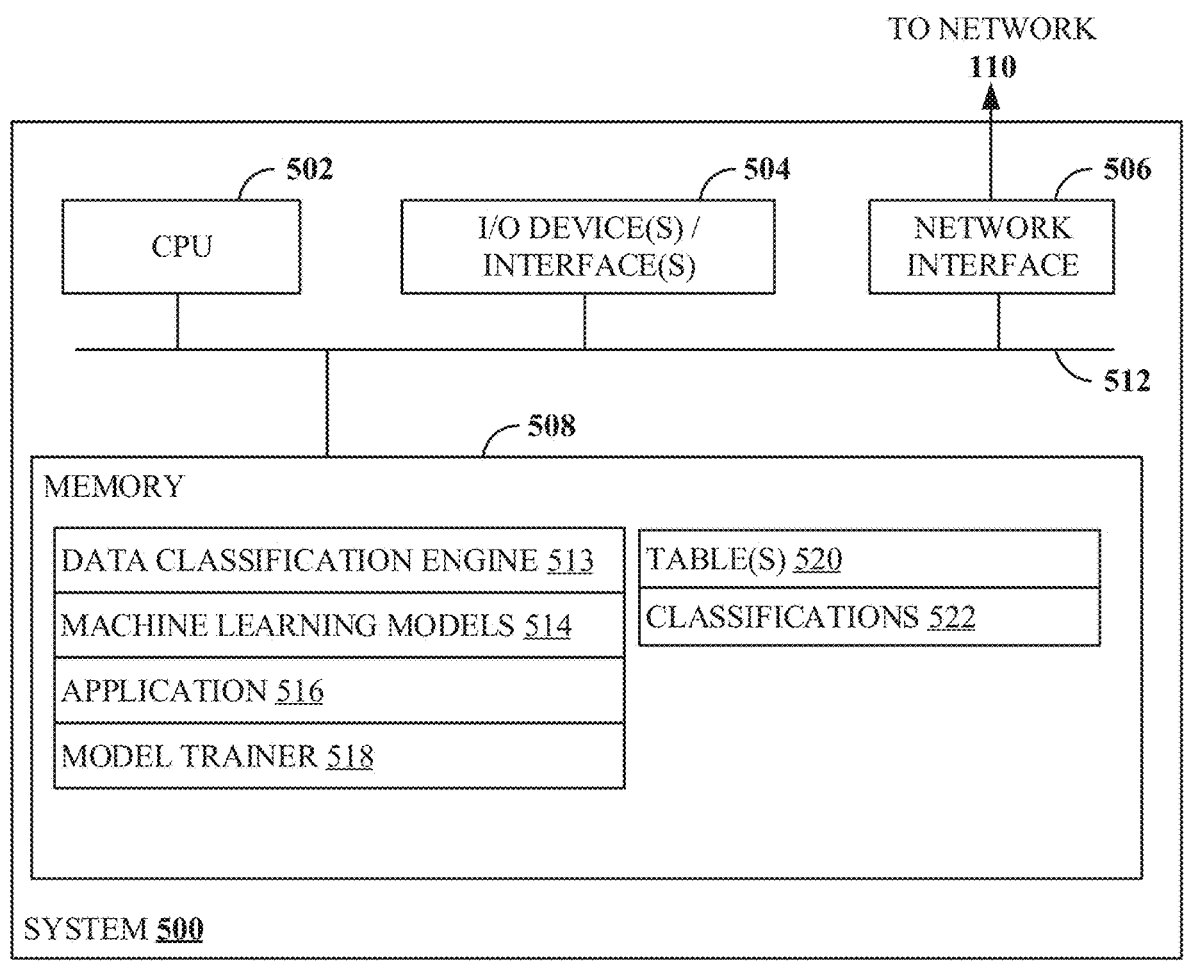
FIG. 5 depicts an example processing system for training and/or utilizing a machine learning model for automated data classification as described herein.

FIG. 5 illustrates an example system 500 with which embodiments of the present disclosure may be implemented. For example, system 500 may be configured to perform operations 400 of FIG. 4.

System 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, and an interconnect 512. It is contemplated that one or more components of system 500 may be located remotely and accessed via a network 110. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes data classification engine 513, which may perform operations described herein related to automated data classification through machine learning, such as operations 400 of FIG. 4. For example, data classification engine 513 may use machine learning models 514 to automatically classify values from tables as described herein. Alternatively, data classification engine 513 may be part of application 516. Data classification engine 513 may further comprise or be associated with a feature extractor and/or a prediction aggregator, such as feature extractor 120 and prediction aggregator 150 of FIG. 1.

Memory 508 includes machine learning models 514 and application 516, which may be representative of column machine learning model 130, value machine learning model 140, and application 190 of FIG. 1.

Memory 508 further comprises table(s) 520, which may correspond to file 110 of FIG. 1 and/or table 210 of FIG. 2. Memory 508 further comprises classifications 522, which may correspond to predictions 132 and 142 and aggregate prediction 152 of FIG. 1, predictions 232 and 242 and aggregate prediction 262 of FIG. 2, and known label 306 and predicted label 310 of FIG. 3.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for automated data classification through machine learning, comprising:
   providing one or more first inputs to a first machine learning model based on a column header of a column from a table, wherein the first machine learning model has been trained through a supervised learning process based on first training data comprising a plurality of column headers associated with labels indicating known classifications of the plurality of column headers;
   receiving a first output from the first machine learning model in response to the one or more first inputs, wherein the first output indicates a first likelihood that the column relates to a given classification;
   providing one or more second inputs to a second machine learning model based on a value from the column, wherein the second machine learning model has been trained through a corresponding supervised learning process based on second training data comprising a plurality of values associated with corresponding labels indicating corresponding known classifications of the plurality of values;
   receiving a second output from the second machine learning model in response to the one or more second inputs, wherein the second output indicates a second likelihood that the value relates to the given classification; and
   determining whether to associate the value with the given classification based on the first output and the second output.

2. The method of claim 1, wherein the one or more first inputs are based on extracting, from the column header, one or more features comprising:
   a plurality of character n-grams;
   one or more word embeddings;
   a total number of characters in the column header;
   a total number of digits in the column header; or
   an indication of whether a particular character is present in the column header.

3. The method of claim 1, wherein the one or more second inputs are based on extracting, from the value, one or more features comprising:
   a plurality of character n-grams;
   one or more word embeddings;
   a total number of characters in the value;
   a total number of digits in the value; or
   an indication of whether a particular character is present in the value.

4. The method of claim 1, wherein the determining of whether to associate the value with the given classification based on the first output and the second output comprises applying a first weight associated with column headers to the first output and a second weight associated with values to the second output.

5. The method of claim 4, wherein the first weight associated with column headers and the second weight associated with values were learned based on the first training data and the second training data.

6. The method of claim 1, further comprising recommending the given classification for the value via a user interface.

7. The method of claim 6, further comprising:
   receiving user input via the user interface in response to the recommending; and
   generating updated training data for the first machine learning model or the second machine learning model based on the user input, wherein the first machine learning model or the second machine learning model is re-trained based on the updated training data.

8. The method of claim 1, wherein the one or more first inputs are based on a set of feature types that were selected based on the supervised learning process.

9. The method of claim 1, wherein the given classification indicates a sensitivity type of the value.

10. The method of claim 9, further comprising restricting access to the value based on the determining whether to associate the value with the given classification.

11. A method for training machine learning models, comprising:
   providing first inputs to a first machine learning model based on a column header of a column from a table;
   receiving first outputs from the first machine learning model in response to the first inputs, wherein the first outputs indicates first likelihoods that the column relates to a given classification;
   comparing the first outputs to a label associated with the column that indicates a known classification associated with the column;
   iteratively adjusting one or more first parameters of the first machine learning model based on the comparing of the first outputs to the label;
   providing second inputs to a second machine learning model based on a value from the column;
   receiving second outputs from the second machine learning model in response to the second inputs, wherein the second outputs indicates second likelihoods that the value relates to the given classification;
   comparing the second outputs to a corresponding label associated with the value indicating a corresponding known classification of the value;

iteratively adjusting one or more second parameters of the second machine learning model based on the comparing of the second outputs to the corresponding label; and learning a first weight to assign to outputs from the first machine learning model and a second weight to assign to corresponding outputs from the second machine learning model based on the first outputs, the second outputs, and the corresponding label associated with the value.

12. The method of claim 11, wherein the first inputs are based on extracting, from the column header, one or more features comprising:

a plurality of character n-grams;
one or more word embeddings;
a total number of characters in the column header;
a total number of digits in the column header; or
an indication of whether a particular character is present in the column header.

13. The method of claim 11, wherein the second inputs are based on extracting, from the value, one or more features comprising:

a plurality of character n-grams;
one or more word embeddings;
a total number of characters in the value;
a total number of digits in the value; or
an indication of whether a particular character is present in the value.

14. A system for automated data classification through machine learning, comprising:

one or more processors; and
a memory comprising instructions that, when executed by the one or more processors, cause the system to:
provide one or more first inputs to a first machine learning model based on a column header of a column from a table, wherein the first machine learning model has been trained through a supervised learning process based on first training data comprising a plurality of column headers associated with labels indicating known classifications of the plurality of column headers;
receive a first output from the first machine learning model in response to the one or more first inputs, wherein the first output indicates a first likelihood that the column relates to a given classification;
provide one or more second inputs to a second machine learning model based on a value from the column, wherein the second machine learning model has been trained through a corresponding supervised learning process based on second training data comprising a plurality of values associated with corresponding labels indicating corresponding known classifications of the plurality of values;
receive a second output from the second machine learning model in response to the one or more second inputs, wherein the second output indicates a second likelihood that the value relates to the given classification; and
determine whether to associate the value with the given classification based on the first output and the second output.

15. The system of claim 14, wherein the one or more first inputs are based on extracting, from the column header, one or more features comprising:

a plurality of character n-grams;
one or more word embeddings;
a total number of characters in the column header;
a total number of digits in the column header; or
an indication of whether a particular character is present in the column header.

16. The system of claim 14, wherein the one or more second inputs are based on extracting, from the value, one or more features comprising:

a plurality of character n-grams;
one or more word embeddings;
a total number of characters in the value;
a total number of digits in the value; or
an indication of whether a particular character is present in the value.

17. The system of claim 14, wherein the determining of whether to associate the value with the given classification based on the first output and the second output comprises applying a first weight associated with column headers to the first output and a second weight associated with values to the second output.

18. The system of claim 17, wherein the first weight associated with column headers and the second weight associated with values were learned based on the first training data and the second training data.

19. The system of claim 14, wherein the instructions, when executed by the one or more processors, further cause the system to recommend the given classification for the value via a user interface.

20. The system of claim 19, wherein the instructions, when executed by the one or more processors, further cause the system to:

receive user input via the user interface in response to the recommending; and
generate updated training data for the first machine learning model or the second machine learning model based on the user input, wherein the first machine learning model or the second machine learning model is retrained based on the updated training data.

* * * * *